UNITED STATES PATENT OFFICE.

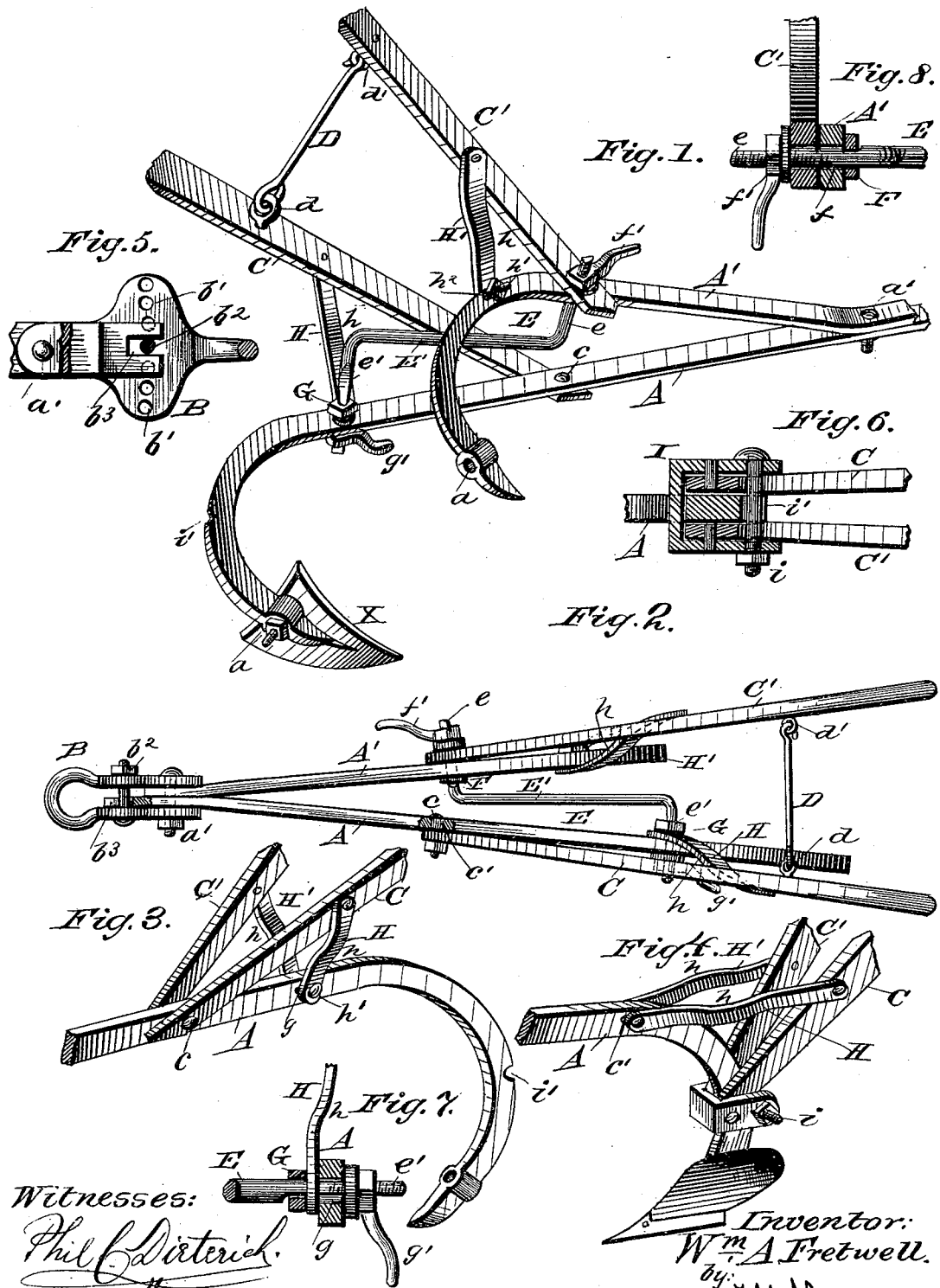

WILLIAM A. FRETWELL, OF REIDSVILLE, NORTH CAROLINA.

PLOW.

SPECIFICATION forming part of Letters Patent No. 353,852, dated December 7, 1886.

Application filed September 11, 1886. Serial No. 213,282. (No model.)

*To all whom it may concern:*

Be it known that I, WILLIAM A. FRETWELL, of Reidsville, in the county of Rockingham and State of North Carolina, have invented certain new and useful Improvements in Plows; and I do hereby declare that the following is a full, clear, and exact description thereof, reference being had to the accompanying drawings, and to the letters of reference marked thereon, which form part of this specification, in which—

Figure 1 is a perspective view, looking from below upward, of my improved plow, parts of which are broken away and other parts are detached. Fig. 2 is a top view indicating the adjustable crank-connection between the beams and the set-nut therefor. Fsg. 3 is a perspective view in detail looking from the front toward the rear of the plow, showing the curved standard notched and perforated without a shovel. Fig. 4 is a modification showing the stilts and a turn-plow attached to the curved beam in lieu of a shovel. Fig. 5 is a side view, partly in section, showing the notched end of the beam and an adjustable clevis applied thereto. Fig. 6 is a section taken horizontally through Fig. 4, as indicated by dotted line $xx$ thereon. Figs. 7 and 8 are sectional details, enlarged, showing the manner of adjustably connecting the cranked rod to the beams and stilts for the purpose of uniting the same.

My invention relates to improvements in cultivators and light turn-plows, which are interchangeable and adjustable, which improvements will be fully understood from the following description and claims, taken in connection with the annexed drawings.

Referring to the drawings by letters, A designates the main beam of the implement, and A' the shorter beam, both of which are curved at their rear ends and perforated, as shown at $a$. The lower termini of these curved beams are tapered and adapted to afford bearings or seats for shovels X of the form shown or of any other suitable form. The shovels X are secured to the curved rear parts of the beams by means of a screw and nut or other suitable fastening.

The front ends of the two beams A A' are connected by a transverse pivot-bolt, $a'$, to which is attached a clevis, B, as shown clearly in Fig. 5. This clevis consists of a loop having a broad portion, $b'$, perforated in the arc of the circle coincident with the axis of the bolt $a'$, and adapted to receive a clevis-bolt, $b^2$, which is received in the notched end $b^3$ of the bar A, as shown in said Fig. 5.

C C' designate the stilts or handles of my improved combined cultivator and plow. These stilts are connected together by a shackle, D, consisting of a transverse connecting hook and eyes, $d\ d'$, which allow a free shackle movement of the two stilts, the shackle D being detachable from the eye $d'$. The front ends of the stilts are pivotally connected to the beams A A' by means of a cranked transverse brace, E, consisting of the angles $e\ e'$ and a longitudinal portion, E', forming a bell-crank. The ends of this crank are screw-threaded and adapted to receive handle-nuts $f'\ g'$ and washers. This end $e$ of the crank is passed through the beam A' and through the stilt C'. The end $e'$ is passed through the beam A and through a standard-brace, H, which is pivoted at its upper end to the stilt C. Directly opposite the standard-brace H is the similar brace, H', which is pivoted at its upper end to the stilt C' and connected to the back of the beam A' by a bolt and nut, $h'$, provision being made by one or more holes $h^2$ for adjusting the lower end of the standard H' forward or backward. It will thus be seen that I have practically a flexible cultivator-frame braced by a crank and capable of being set at any desired point of adjustment for hill or level land.

By detaching the beam A' from beam A and using a clip, I, and binding-bolt $i$, and a nut and pivot, $q$, I may attach the stilts C C' to the back of the said beam, employing in the modification shown in Fig. 4 the standards $h$ $h'$ as braces and using a light turn-plow. Thus converted, the bolt $i$ crosses a notch, $i'$, made in the back of the standard A.

Having described my invention, I claim—

1. In a cultivator, the two curved beams A A', pivoted near their front ends, in combination with the cranked brace and its nuts, and a standard connecting the stilts to said beams, substantially in the manner and for the purpose described.

2. In a cultivator, the combination of the pivotally-connected beams A A', the crank E, connecting one beam with the stilt C' direct, the brace-standard H', connecting the said stilt to the said beam, the standard H, pivotally connected to the stilt C and connected by the arm e' of the crank to the beam A, all constructed and adapted to operate substantially in the manner and for the purpose set forth.

In testimony that I claim the foregoing as my own I affix my signature in presence of two witnesses.

WILLIAM A. FRETWELL.

Witnesses:
 JAMES SLOAN,
 H. B. BURNETT.